US011574353B2

(12) United States Patent
Polanía Cabrera et al.

(10) Patent No.: US 11,574,353 B2
(45) Date of Patent: Feb. 7, 2023

(54) COMPATIBILITY BASED FURNITURE RECOMMENDATIONS

(71) Applicant: Target Brands, Inc., Minneapolis, MN (US)

(72) Inventors: Luisa Fernanda Polanía Cabrera, Sunnyvale, CA (US); Mauricio Alejandro Flores Ríos, Minneapolis, MN (US); Matthew Seth Nokleby, Minneapolis, MN (US); Yiran Li, Sunnyvale, CA (US)

(73) Assignee: Target Brands, Inc., Minneapolis, MN (US)

( * ) Notice: Subject to any disclaimer, the term of this patent is extended or adjusted under 35 U.S.C. 154(b) by 328 days.

(21) Appl. No.: 16/858,361

(22) Filed: Apr. 24, 2020

(65) Prior Publication Data

US 2021/0110457 A1   Apr. 15, 2021

Related U.S. Application Data

(60) Provisional application No. 62/912,861, filed on Oct. 9, 2019.

(51) Int. Cl.
*G06Q 30/06* (2012.01)
*G06F 16/532* (2019.01)
(Continued)

(52) U.S. Cl.
CPC ....... *G06Q 30/0631* (2013.01); *G06F 16/532* (2019.01); *G06F 16/9535* (2019.01);
(Continued)

(58) Field of Classification Search
CPC ...... G06N 3/0445; G06N 3/0454; G06N 3/08; G06V 10/426; G06V 20/00; G06V 10/40;
(Continued)

(56) References Cited

U.S. PATENT DOCUMENTS 7,398,413 B2 * 7/2008 Hampel ................. G11C 7/222
711/105
8,086,466 B2 * 12/2011 Stinson .............. G06Q 30/0621
705/26.1

(Continued)

OTHER PUBLICATIONS

Captain, Sean, "West Elm's New AI Tool Scans Pinterest To Recommend Furnishings", Robot Revolution—(https://www.fastcompany.com/40437412/west-elms-new-ai-tool-scans-pi . . . ), Jul. 6, 2017—3 Pages.

(Continued)

*Primary Examiner* — Andrew Joseph Rudy
(74) *Attorney, Agent, or Firm* — Merchant & Gould P.C.

(57) ABSTRACT

Examples disclosed herein are relevant to systems, methods, and other technology for determining furniture compatibility. For example, graph neural networks (GNNs) that leverage relational information between furniture items in a set may be used as models to predict a compatibility score indicative of visual compatibility of furniture items across the set. In one implementation, the GNN-based model can extend the concept of a siamese network to multiple inputs and branches and use a generalized contrastive loss function. In another implementation, the GNN-based model learns both an edge function and the function that generates the compatibility score. The predicted compatibility score can be used for a variety of purposes, including furniture item recommendations.

19 Claims, 10 Drawing Sheets

(51) Int. Cl.
*G06F 16/9535* (2019.01)
*G06Q 10/08* (2012.01)
*G06K 9/62* (2022.01)
*G06T 11/20* (2006.01)
*G06N 3/08* (2006.01)
*G06V 10/40* (2022.01)
*G06V 20/00* (2022.01)

(52) U.S. Cl.
CPC .............. *G06K 9/6217* (2013.01); *G06N 3/08* (2013.01); *G06Q 10/087* (2013.01); *G06T 11/206* (2013.01); *G06V 10/40* (2022.01); *G06V 20/00* (2022.01)

(58) Field of Classification Search
CPC ... G06F 16/532; G06F 16/9535; G06K 9/627; G06K 9/6262; G06K 9/6215; G06K 9/6217; G06K 9/46; G06K 9/62; G06K 9/00; G06Q 10/08; G06Q 10/087; G06Q 30/0631; G06Q 30/06; G06T 11/206; G06T 11/20
USPC ........................................................ 705/26.7
See application file for complete search history.

(56) References Cited

U.S. PATENT DOCUMENTS

| | | | | |
|---|---|---|---|---|
| 9,043,338 | B1* | 5/2015 | Baluja | G06F 16/33 707/748 |
| 9,398,413 | B1* | 7/2016 | Scalise | H04N 21/00 |
| 9,697,537 | B2* | 7/2017 | Balasubramanian | G06Q 30/0261 |
| 9,881,226 | B1* | 1/2018 | Rybakov | G06T 7/11 |
| 10,109,051 | B1* | 10/2018 | Natesh | G06V 10/56 |
| 10,176,198 | B1* | 1/2019 | Dhua | G06V 10/454 |
| 10,255,686 | B2* | 4/2019 | Bhardwaj | G06T 7/50 |
| 10,650,222 | B2* | 5/2020 | Olsen | A63F 13/98 |
| 10,698,740 | B2* | 6/2020 | Busayarat | G06F 9/5077 |
| 10,776,417 | B1* | 9/2020 | Ravichandran | G06V 10/454 |
| 10,788,326 | B2* | 9/2020 | Cline | G06F 16/29 |
| 10,860,836 | B1* | 12/2020 | Tyagi | G06N 3/0454 |
| 10,997,784 | B2* | 5/2021 | Vandenbrouck | H04L 41/145 |
| 11,005,962 | B2* | 5/2021 | Busayarat | H04N 21/43 |
| 11,321,759 | B2* | 5/2022 | Adams | G06Q 30/0625 |
| 2006/0101742 | A1 | 5/2006 | Scott-Leikach et al. | |
| 2013/0215116 | A1* | 8/2013 | Siddique | G06Q 20/40 705/26.7 |
| 2014/0172627 | A1* | 6/2014 | Levy | G06Q 30/02 705/26.7 |
| 2017/0039468 | A1 | 2/2017 | Zeiler | |
| 2020/0160154 | A1* | 5/2020 | Taslakian | G06N 3/08 |

OTHER PUBLICATIONS

Cui, Zeyu et al., "Dressing as a Whole: Outfit Compatibility Learning Based on Node-wise Graph Neural Networks", Creative Commons CC-BY 4.0 License (International World Wide Web Conference Committee, San Francisco, CA), May 13-17, 2019, 11 Pages.

Kingma, Diederik P. et al., "ADAM: a Method for Stochastic Optimization", Published as a conference paper at ICLR 2015—15 Pages.

* cited by examiner

COMPATIBILITY BASED FURNITURE RECOMMENDATIONS

CROSS-REFERENCE TO RELATED APPLICATION

The present application claims priority to U.S. Provisional Patent Application No. 62/912,861 filed Oct. 9, 2019, the disclosure of which is hereby incorporated by reference in its entirety.

BACKGROUND

The increasing availability of electronic shopping venues (e.g., online retailers or app-based stores), each with ever-expanding catalogs, can increase the difficulty of surfacing specific products that suit the user's interests. Recently, the field of recommender systems have grown to attempt to address this issue. Many recommender systems are based on user-item interactions (e.g. collaborative filtering), which do not typically take into account visual aspects of items. There has also been interest in computer-vision-based solutions to visual compatibility problems for fashion and furniture because visual compatibility can be beneficial to attaining successful recommender systems for fashion outfits and furniture sets.

Many authors have framed the problem of visual compatibility as a metric learning problem. For example, *Learning Fashion Compatibility Across Apparel Categories for Outfit Recommendation* describes two sub-networks: (1) a siamese network that extracts features for an input pair of images, and (2) a deep metric learning network. Polania and Gupte, arXiv preprint ARXIV:1905.03703 (2019). The whole model is trained end-to-end to derive a notion of compatibility between a pair of items. In *Learning Fashion Compatibility with Bidirectional LSTMS*, the outfit generation process is modeled as a sequential process through bidirectional LSTMs. Han et al., PROCEEDINGS OF THE 25TH ACM INTERNATIONAL CONFERENCE ON MULTIMEDIA, pp. 1078-1086 (ACM, 2017). Additionally, Graph Neural Networks (GNNs), have been proposed for fashion, such as in *Context-Aware Visual Compatibility Prediction* (Cucurull et al., PROCEEDINGS OF THE IEEE CONFERENCE ON COMPUTER VISION AND PATTERN RECOGNITION, pp. 12617-12626 (2019)) and *Dressing as a Whole: Outfit Compatibility Learning Based on Node-Wise Graph Neural Networks* (Cui, et al., THE WORLD WIDE WEB CONFERENCE, pp. 307-317 (ACM, 2019)).

Until recently, the problem of furniture compatibility has received less attention. *Learning Style Compatibility for Furniture* proposed to address style compatibility and classification among categories of furniture using a siamese network and a joint image-text embedding method. Aggarwal, et al., GERMAN CONFERENCE ON PATTERN RECOGNITION, pp. 552-566 (Springer, 2018). And *Visual Classification of Furniture Styles* proposes to address the style classification problem by creating handcrafted features using standard feature extractors, such as SIFT and HOG, and then applying an SVM classifier. Hu, et al., ACM TRANSACTIONS ON INTELLIGENT SYSTEMS AND TECHNOLOGY, 8(5):67 (2017). Others have devised models to predict the style compatibility of computer-generated 3D furniture models. See, e.g., T. Liu, et al., *Style Compatibility for 3d Furniture Models*, ACM TRANSACTIONS ON GRAPHICS 34(4):85 (2015); Lun, et al., *Elements of Style: Learning Perceptual Shape Style Similarity*, ACM TRANSACTIONS ON GRAPHICS, 34(4):84 (2015); and Pan et al., *Deep Model Style: Cross-Class Style Compatibility for 3d Furniture within a Scene*, 2017 IEEE International Conference on Big Data, pp. 4307-4313 (IEEE, 2017).

SUMMARY

In a first aspect, example methods for determining a furniture compatibility score are described. An example method comprising: receiving images of furniture items within a set; converting the images into a graph representation of the set comprising a plurality of nodes, wherein each of the furniture items corresponds to a respective node of the plurality of nodes and each respective node has a hidden state; for the plurality of nodes, updating the hidden state of each respective node with information from nodes neighboring the respective node; and generating a compatibility score of the set based on the updated hidden state of each respective node.

In a second aspect, example methods for providing furniture item recommendations based on compatibility are described. An example method comprising: receiving images of one or more furniture items associated with a user; identifying a furniture item that is distinct from the one or more furniture items; forming a set of furniture item images from the received images and an image of the identified furniture item; providing the set as input to a machine-learning model comprising a graph neural network that processes the set to predict a compatibility score of the set; receiving the compatibility score as output from the machine-learning model; and providing the identified furniture item as a recommendation to the user based on the compatibility score.

In a third aspect, example systems for providing furniture item recommendations based on compatibility are described. An example system comprises a processor and a memory communicatively coupled to the processor. The memory stores instructions that, when executed by the processor, cause the system to: receive images of one or more furniture items associated with a user; identify a furniture item that is distinct from the one or more furniture items; form a set of furniture item images from the received images and an image of the identified furniture item; provide the set as input to a machine-learning model comprising a graph neural network that processes the set to predict a compatibility score of the set; receive the compatibility score as output from the machine-learning model; and provide the identified furniture item as a recommendation to the user based on the compatibility score.

BRIEF DESCRIPTION OF THE DRAWINGS

Non-limiting and non-exhaustive examples are described with reference to the following figures. The same number represents the same element or same type of element in all figures.

DETAILED DESCRIPTION

Figure 1:
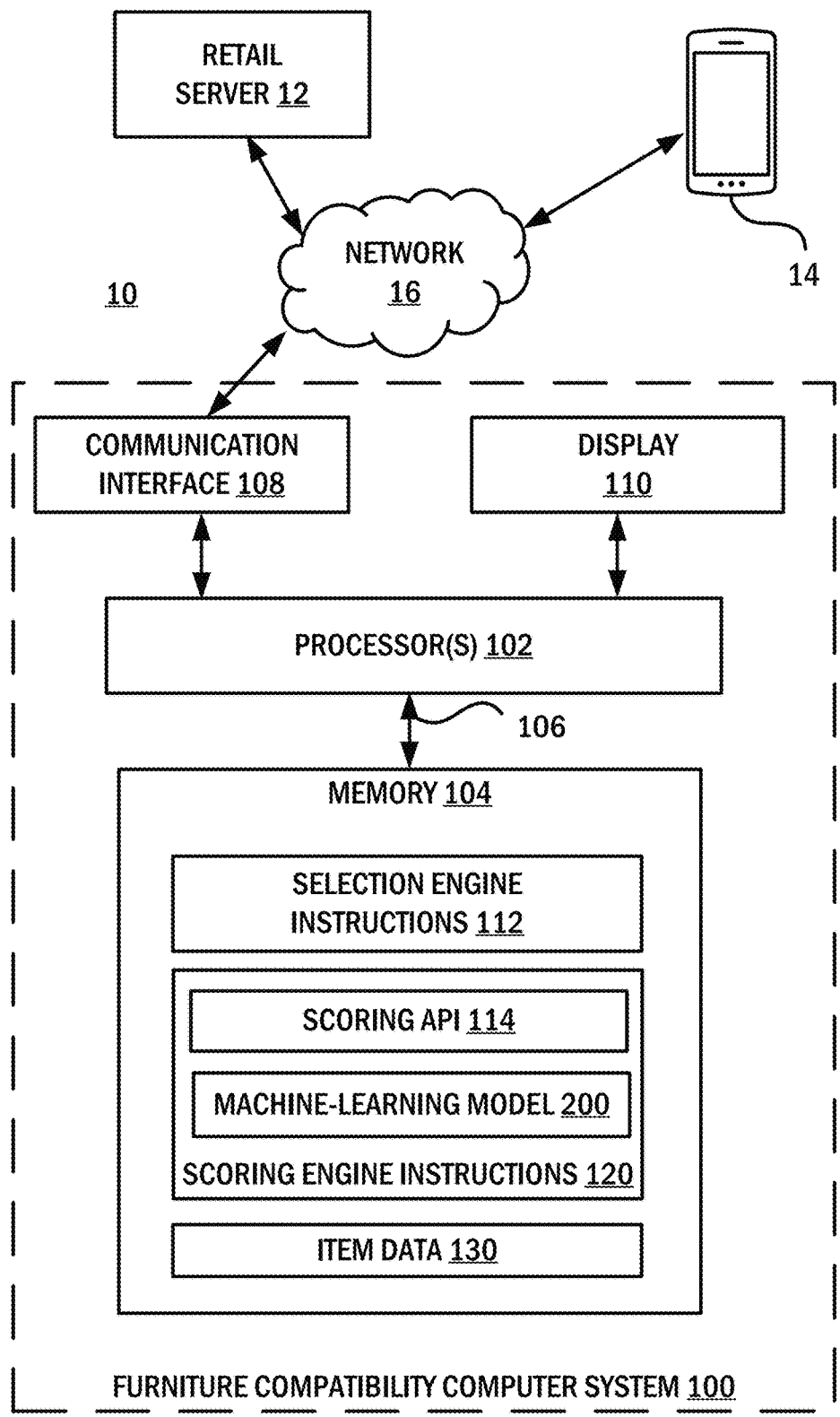
FIG. 1 illustrates a system for presenting furniture item recommendations in a networked environment, according to an example embodiment.

This application includes technology for determining furniture compatibility, such as via a machine-learning model using Graph Neural Networks (GNNs). In an example, a result produced by a system or method herein includes a predicted compatibility score for a given set of furniture items using one or more GNNs. The use of one or more GNNs can exploit the underlying relational information between the furniture items to predict compatibility of the given set. This use can be in contrast to traditional siamese-based models, since it is capable of assessing items of a pair independently. Also, such siamese-based models can lack an ability to measure similarity or compatibility in sets or collections of more than two items. While one could assemble collections of multiple items by aggregating pair-wise compatibility scores, such approach can disregard the complex stylistic interactions that different items (or item collections of more than two items) may have. Meanwhile, sequential generation artificially can introduce a notion of time dependence into the model. For at least these reasons, disclosed examples are relevant to improving computer systems by causing computing systems to produce more accurate results.

Disclosed examples herein can include a machine-learning model comprising one or more GNNs configured to learn an edge function between nodes within a fully-connected network. In at least some examples herein, a set of furniture item images is represented as a graph, where each node represents a furniture item from the set and each edge represents an interaction between two furniture items. In contrast to siamese-based models that perform pairwise comparisons in isolation, such graph representations can better capture the complex relations among multiple items in a furniture set.

To generate the graph representation, an example model first extracts features from the image of each furniture item in the set, which are used as the initial node representations within the graph. A hidden state of each node evolves over time by exchanging information with its neighboring nodes via message passing. Weights in the model are shared across nodes, which gives the model the ability to handle a different number of inputs, which is relevant because the number of items in a furniture set can vary.

Disclosed examples can include two primary variants of the model. An example architecture of the first variant can be a type of extension of the siamese model to multiple inputs (e.g., rather than only a pair of inputs) and multiple branches. In contrast to siamese models, the model is trained with a generalized contrastive loss function. Instead of minimizing the features distance of the positive pairs and maximizing the features distance of the negative pairs, the generalized contrastive loss function enforces embeddings of items belonging to a compatible set to cluster tightly together, forming a compact set, while the embeddings of non-compatible items are pushed apart from their centroid by a distance greater than a margin. In an example, the centroid can be calculated based on an average of the hidden states. The compatibility score can be estimated by calculating the average distance of the item embeddings to their centroid.

The second variant replaces the predefined functions of the first variant, such as the edge function and the function that estimates the compatibility score, with trainable neural networks to learn the respective functions. Learning the edge function can relate to graph attention networks, which learn scalar weights between two connected nodes and achieve better performance compared to assuming identical or predetermined edge weight approaches as in GRAPHSAGE (see Hamilton, et al., *Inductive Representation Learning on Large Graphs*, ADVANCES IN NEURAL INFORMATION PROCESSING SYSTEMS, pp. 1024-1034 (2017)) or GCN (Kipf and Welling. *Semi-Supervised Classification with Graph Convolutional Networks*, ARXIV:1609.02907 (2016)), respectively. Additionally, an example architecture of the second variant of the model adds an aggregation and read-out function to the first example architecture to generate the compatibility score.

Disclosed examples are relevant to improvements to the functioning of computers. While individuals may develop an intuitive sense for whether items are compatible, it can be difficult, if not impossible for a user to define parameters for why two items are compatible with each other. Thus, disclosed techniques go beyond merely automating a mental process using a computer as a tool. Instead, techniques disclosed herein include techniques that enable computers to determine compatibility in a manner different from how individuals traditionally would do so. Further, as item compatibility decisions evolve, models disclosed herein can be retrained and evolve to provide improved computational accuracy.

As used herein, "compatibility" relates to how similar a set of furniture items are to sets of furniture items labeled or otherwise indicated as being compatible together. In some examples, compatibility may be based on a style of furniture items in the sets. In other examples, compatibility may be further based on color, material, and/or texture in addition to the style of furniture items in the sets. A "compatibility score" is a numeric value indicating a relative amount of compatibility across a set of furniture items. For a sufficient quantity and quality of training data, a label is usable as a proxy for how compatible a set of furniture items within the training data is. For example, the label may be a value of 0 or 1, where 0 indicates a lack of compatibility (e.g., a negative training sample) and 1 indicates compatibility (e.g., a positive training sample). The machine-learning model may be trained using this training data to learn visual compatibility of furniture items across a set. Once trained, the machine-learning model may be used to generate a compatibility score for a set of furniture items for further use in recommending furniture items that are compatible with a set. The notion of complementarity or compatibility used in the training samples can be derived from product collections curated by merchandising partners or home decorators that determine what consumers like. Thus, the techniques disclosed herein can leverage the expertise of human curators and use machine-learning to automatically generate product recommendations that are complementary without further assistance from human curators. As will be understood in the art, even experts can disagree about whether a same set of furniture items is compatible. Thus, determining objective compatibility from first principles is beyond the scope of the instant application.

System for Providing Furniture Selections in a Networked Environment

FIG. 1 illustrates a system 10 for presenting furniture item recommendations in a networked environment, according to an example embodiment. The system 10 includes a furniture compatibility computing system 100 communicatively connected to a retail server 12 via a network 16 (e.g., the Internet). The retail server 12 may be associated with a retailer that sells furniture items to consumers. The retail server 12 provides the furniture items to a user device 14 connected to the network 16 for presentation to a user. The user device 14 displays the presented items to the user, such as via a webpage rendered in a web browser or as part of an application executing on the user device 14. In some examples, the user is a consumer interested in purchasing furniture items from the retailer.

The illustrated furniture compatibility computing system 100 includes one or more processors 102 communicatively connected to a memory 104 via a data bus 106. The one or more processors 102 can be of any of a variety of types of programmable circuits (e.g., a central processing unit) capable of executing computer-readable instructions to perform various tasks, such as mathematical and communication tasks. The memory 104 includes any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media can include solid state memory. The memory 104 can be transitory or non-transitory.

The furniture compatibility computing system 100 can also include a communication interface 108 configured to receive and transmit data, such as via the network 16. For example, via the communication interface 108, the furniture compatibility computing system 100 can access data in an external database or to provide item recommendations to the retail server 12 for presentation to the user device 14. In other examples, the furniture compatibility computing system 100 communicates directly with the user device 14 over the network 16 via the communication interface 108. In some examples, the furniture compatibility computing system 100 includes a local interface, such as a display 110 for presenting information to a local user (e.g., an administrator) and one or more input devices (e.g., keyboards or mice) for obtaining input from the local user.

In the example shown, the memory 104 stores selection engine instructions 112, scoring engine instructions 120, and item data 130.

The selection engine instructions 112 are instructions executable by the processor 102 to cause execution of a program that operates to select furniture items, such as by sending recommended furniture items to the retail server 12 (e.g., for display to the user visiting a furniture retail website hosted by the retail server 12). In an example, the selection engine instructions 112 can cause the processor 102 to receive, as input, a set of furniture items (e.g., furniture items owned by or in a shopping cart of a user) and provide, as output, an identifier of one or more furniture items provided by the retail server that has a high compatibility score with the set of furniture items (e.g., a recommendation to purchase the furniture item because it is highly compatible with what the user has or is considering purchasing). The identification of the one or more furniture items can be sent to the retail server 12. These recommendations can leverage the scoring engine instructions 120 and the item data 130 in providing one or more recommendations. As discussed in more detail below, the selection engine instructions 112 can be executed to cause the processor 102 to identify furniture items associated with high compatibility scores as determined by executing the scoring engine instructions 120 and provide the identified furniture items directly to the user device 14, or to the retail server 12 (e.g., for delivery to the user device 14 in response to a request from that user device 14) for display as a recommendation. For example, the identified furniture items may be associated with compatibility scores that meet or exceed a threshold score. Example user interfaces for displaying such recommendations are described in greater detail below in association with FIG. 8.

The selection engine instructions 112, when executed, can analyze data, such as the item data 130, to determine relationships among furniture items to identify furniture items to select (e.g., for recommendation). This determining can include, for example, identifying furniture items that are complementary to other furniture items that have been or may be selected by a user. For instance, a set of two or more furniture items can be deemed compatible if a compatibility score for the set is greater than a predetermined threshold. In examples, the selection engine instructions 112, when executed, cause the processor 102 to incorporate furniture item descriptions or other information that describes a furniture item into the analysis.

The selection engine instructions 112 can expose a scoring Application Programming Interface (API). The API associated with the selection engine instructions 112 can be a set of routines defined by the selection engine instructions 112 and exposed to other systems and processes to cause particular actions to occur relating to the selection engine instructions 112, such as return a list of selected furniture items that are compatible with one or more furniture items in a seed item set. In some examples, the seed item set includes one or more furniture items that are already owned by the user or that are of interest to the user (e.g., in an online shopping cart of the user). For instance, there may be a routine made accessible by the API that allows the retail server 12 to request, based on a set of furniture items, recommended items that are compatible with the set of furniture items. The API can respond with a listing of a plurality of furniture items in various formats (e.g., via XML or similar markup language document). The listing can indicate furniture items to be selected to be provided to the user (e.g., as a recommendation) in accordance with operation of the selection engine instructions 112, as discussed below.

The scoring engine instructions 120 are a set of instructions executable by the one or more processors 102 to cause execution of a program that can receive a set of at least two furniture items as input and return a compatibility score for the set as output. In the illustrated example, the scoring engine instructions 120 can define a scoring API 114 and a machine-learning model 200.

The scoring API 114 is a set of routines defined by the scoring engine instructions 120 and exposed to other systems and processes to cause particular actions to be taken relating to the scoring engine instructions 120. For instance, the scoring API 114 can include an API that receives a set of furniture item images to provide to the machine-learning model 200 as input, and returns a compatibility score of the set predicted and output by the machine-learning model 200.

The machine-learning model 200 is a model formed from one or more machine-learning frameworks (e.g., one or more GNNs). The machine-learning model 200 can be configured to receive a set of furniture item images as input and provide a compatibility score of the set as output. The compatibility score can then be used for selecting furniture items for recommendation as described above. Example implementations of the machine-learning model 200 are shown and described with respect to FIGS. 2-5.

In examples, the scoring engine instructions 120 can include instructions executable to generate or train the machine-learning model 200 from training data. For example, the scoring engine instructions 120 can cause a machine-learning model 200 to be generated based on input regarding known complementary furniture items and furniture item data, such as training datasets obtained from human curators.

The item data 130 is data regarding furniture items. In many examples, the item data 130 is a database of furniture items available for sale via the retail server 12. The entries of the item data 130 can each represent a furniture item and be stored in conjunction with data regarding the furniture item, such as a category of the furniture item, a price, and an item description, among other data.

Example Implementations

Figure 2:
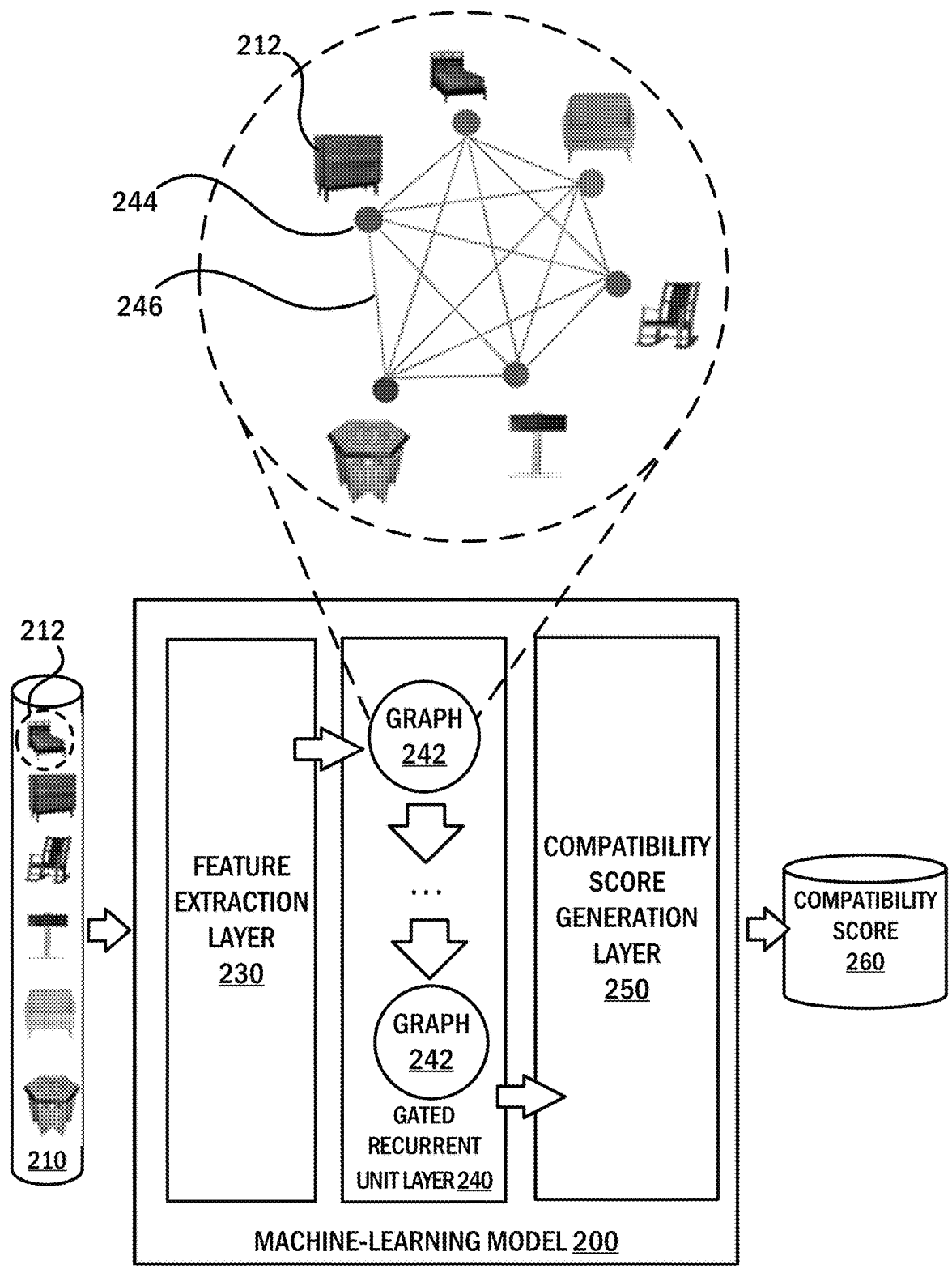
FIG. 2 illustrates an example representation of a machine-learning model that takes a set of furniture item images as input and produces a compatibility score of the set as output.

FIG. 2 illustrates an example representation of a machine-learning model 200 that receives a set 210 of images of furniture items 212 as input and produces a compatibility score 260 for the set 210 as output.

As discussed in greater detail below with respect to FIGS. 3-5, the machine-learning model 200 can initially be trained, validated, and tested with labeled training samples during a training phase, and then implemented in a prediction phase to produce compatibility scores 260 for use in recommending compatible furniture items for a seed item set. Regardless of whether the set 210 is a training sample received as input during the training phase or the set 210 is a seed item set received as input during the prediction phase, the machine-learning model 200 may process the set 210 to produce the compatibility score 260 as described herein with respect to FIG. 2.

In some examples, the machine-learning model 200 can process a representation of the set 210 as a graph 242 with each node 244 in the graph 242 representing a furniture item 212 of the set 210 and each edge 246 of the graph 242 represents interaction between two furniture items 212 of the set 210. The machine-learning model 200 can include a GNN model that has three primary parts. A first part can be a feature extraction layer 230 configured to convert the set 210 into an initial graph 242 representation. A second part can be a Gated Recurrent Unit (GRU) layer 240 configured to model node 244 interactions and update a hidden state of each of the nodes 244 by propagating information from neighboring nodes 244. A third part can be a compatibility score generation layer 250 that calculates the compatibility score based on the output of the GRU layer 240.

Disclosed below are two example variants of the machine-learning model 200, which can be referred to as Model I and Model II. These variants of the machine-learning model 200 primarily differ in how each implementation calculates the compatibility score 260 and in the definition of the edge function. In Model I, the compatibility score 260 is determined by the average distance between node states and an associated centroid and the edge function is pre-defined. In Model II, the compatibility score 260 is determined based on an aggregation of the node states that is further processed to generate the compatibility score 260 and the edge function is learnable. These differences can lead to variances in model capacity gains (e.g., where Model II has higher performance compared to Model I) and memory and computational cost (e.g., where Model I has lower memory and computational costs than Model II). Additional details regarding each of the variants are described below. These models are provide as examples, other models can be used.

Model I

The set 210 can be a set of images of the furniture items 212. The images can belong to an arbitrary furniture set. The set 210 can be represented as $S=\{I_0, I_1, \ldots, I_{N-1}\}$, where S refers to the set 210 and I represents an image from the set 210. The images can be mapped to a latent semantic space with one or more convolutional neural networks (CNNs). This operation can be performed by the feature extraction layer 230 and can be represented as $h_i^0=\psi(I_i)$, $i=0, \ldots N-1$, where $h_i^0 \in \mathbb{R}^L$ denotes the L-dimensional initial hidden state of node i (e.g., the node 244 representing the furniture item 212 from which features are being extracted) and $\psi$ denotes the feature extractor operator (e.g., AlexNet). The number of items N may vary across different furniture sets, and therefore, each furniture set would have its own graph morphology.

The feature representation of a furniture item 212 can include information about the furniture items with which it is compatible. This can be performed by iteratively updating hidden states of a node 244 with information from neighboring nodes 244 using a GRU as part of the GRU layer 240. For example, at each time step k, a GRU takes a previous hidden state of a node $h_i^{k-1}$ and a message $m_i^k$ as input and outputs a new hidden state.

The message $m_i^k \in \mathbb{R}^M$ is the result of aggregating the messages from the node neighbors, and is defined by the aggregation function $\phi(\cdot)$ as $$m_i^k = \phi(\{h_q^k \mid \forall q, q \neq i\})$$

$$= \frac{1}{N} \sum_{q, q \neq i} \text{ReLU}(W_m(h_q^k \parallel e_{qi}^k) + b_m),$$

where $W_m \in \mathbb{R}^{M \times (L+J)}$ and $b_m \in \mathbb{R}^M$ are trainable parameters of Model I and $e_q^k \in \mathbb{R}^J$ is the edge feature between nodes q and i, which is calculated with the edge function $v(\cdot)$ as $e_{qi}^k = v(h_q^k, h_i^k)$. Where the graph 242 is complete, neighboring nodes include all other nodes 244, as illustrated in FIG. 2.

The pre-defined edge function of Model I can be the absolute distance function:
$v(h_q^k, h_i^k)=|h_q^k-h_i^k|$, where $|\cdot|$ denotes element-wise absolute value. The absolute difference function is symmetric, such that $v(h_q^k, h_i^k)=v(h_i^k, h_q^k)$. The use of the absolute difference can provide information about the distance between two connecting nodes 244 in the feature representation space.

The operations within the GRU, which can allow for the network to adaptively reset or update its memory content, can be defined as follows:

$$z_i^k = \sigma(W_z m_i^k + U_z h_i^{k-1})$$

$$r_i^k = \sigma(W_r m_i^k + U_r h_i^{k-1})$$

$$\tilde{h}_i^k = \tanh(W_h m_i^k + U_h(r_i^k \odot h_i^{k-1})),$$

$$h_i^k = (1-z_i^k) \odot h_i^{k-1} + z_i^k \odot \tilde{h}_i^k,$$

where $r_i^k$ and $z_i^k$ are the reset and update gates, $\tilde{h}_{i,j}^k$ is the candidate memory content, $\sigma(\cdot)$ is the logistic sigmoid function, $\odot$ denotes the element-wise multiplication operation, and matrices $W_z$, $W_r$, $W_h$, $U_z$, $U_r$, and $U_h$ are model parameters.

The final layer, the compatibility score generation layer 250, can take the hidden states $h_0^K, \ldots, h_{N-1}^K$ as input, average their distance to the centroid, and pass the average through a sigmoid function, which maps onto the interval [0,1], to generate the compatibility score 260. More formally, the compatibility score s can be calculated as:

$$s = \sigma\left(\frac{1}{N} \sum_{i=1}^{N} \|h_i^k = c\|_2^2\right),$$

where $\sigma(\cdot)$ is the sigmoid function.

During a training phase, a loss function can be implemented. The loss function for Model I can be a contrastive loss function. Contrastive loss has been extensively used in the context of siamese networks for learning an embedded feature space where similar pairs are closer to each other and dissimilar pairs are distant from each other. But one limitation of contrastive loss is that it is based only on feature pairs. Here, a generalized version of the contrastive loss can be used that promotes the item embeddings of a compatible furniture set to cluster tightly together while the item embeddings of a non-compatible furniture set are pushed away from their corresponding centroid. The centroid of the hidden states of the nodes at step K can be denoted as c, then the generalized contrastive loss for a training instance takes the form:

$$L = y \sum_{i=1}^{N} d_i^2 + (1-y) \sum_{i=1}^{N} \max(0, m^2 - d_i^2)$$

$$d_i = \|h_i^K - c\|_2$$

where $y \in \{0,1\}$ is the label with 1 and 0 denoting a compatible and a non-compatible furniture set, respectively. The first term of the loss function penalizes compatible furniture sets whose node representations are not tightly clustered around their centroid while the second term penalizes non-compatible furniture sets whose node representations are closer than a margin m from their centroid.

Using the above-described Model I, the set 210 can be provided as input and a compatibility score 260 for the set can be produced as output.

Model II

In an alternative model, Model II, there is a different compatibility score generation layer 250 and a different edge function can be used. Similar to Model I, one or more CNNs can be used to produce initial feature representation of the nodes 244 as part of the feature extraction layer 230, and GRUs of the GRU layer 240 can be used to update the hidden state of the nodes 244 during K iterations, which results in $h_0^K, \ldots, h_{N-1}^K$ hidden states.

The compatibility score generation layer 250 can have added steps compared to Model I to generate the compatibility score 260. First, the hidden states of the nodes 244 can be averaged, $$\frac{1}{N} \sum_{i=1}^{N} h_i^{K+1},$$

and then passed through a fully connected layer, with weight matrix $W_p \in \mathbb{R}^{P \times L}$ and bias term $b_p \in \mathbb{R}^P$, followed by a ReLU function to attain a higher level representation $h_o$. Then, a read-out function, $o(\cdot)$, can be used to generate the compatibility score 260 using the following equation:

$$s = o(h_o) = \sigma(W_o h_o + b_o)$$

where s is the compatibility score 260, $W_o \in \mathbb{R}^{1 \times P}$, and $b_o \in \mathbb{R}^1$ are trainable parameters In Model II, the parameters that define the edge function are learned. For example, the edge function connecting node $h_i$ with node $h_j$ can be defined as:

$$v(h_i^k, h_j^k) = \text{ReLU}(W_e(h_i^k \| h_j^k) + b_e),$$

where $W_e \in \mathbb{R}^{J \times 2L}$ and $b_e \in \mathbb{R}^J$ are parameters of the model.

During a training phase, the loss function for Model II can be the binary cross-entropy loss function. This can be defined as:

$$L = y \log(s) + (1-y) \log(1-s),$$

where, y is the truth label for the training instance.

Phases of the Machine-Learning Model

Figure 3:
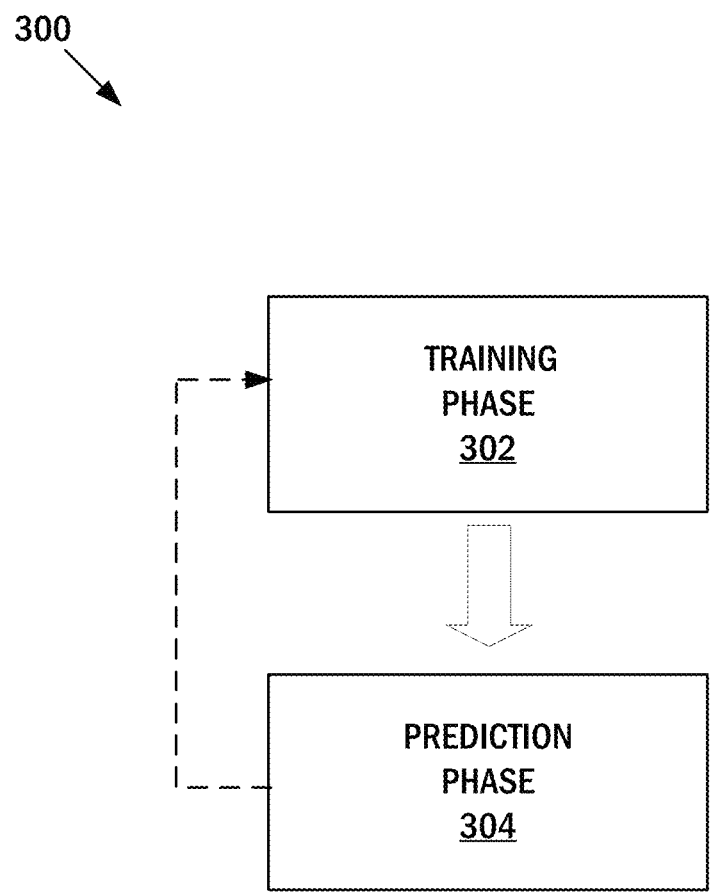
FIG. 3 illustrates example phases of a machine-learning model.

FIG. 3 illustrates example phases 300 of the machine-learning model 200. The example phases 300 can include a training phase 302 described in detail with respect to FIG. 4, and a prediction phase 304 described in detail with respect to FIG. 5. For example, the machine-learning model 200 may first be trained, validated, and tested during the training phase 302 using training samples having curated labels for furniture items sets that are indicative of compatibility. Once sufficiently trained, the machine-learning model 200 can then be used to predict compatibility scores for unlabeled furniture item sets during the prediction phase 304. In some embodiments, feedback based on the predictions output by the machine-learning model 200 during the prediction phase 304 can be used to further train the machine-learning model 200.

Figure 4:
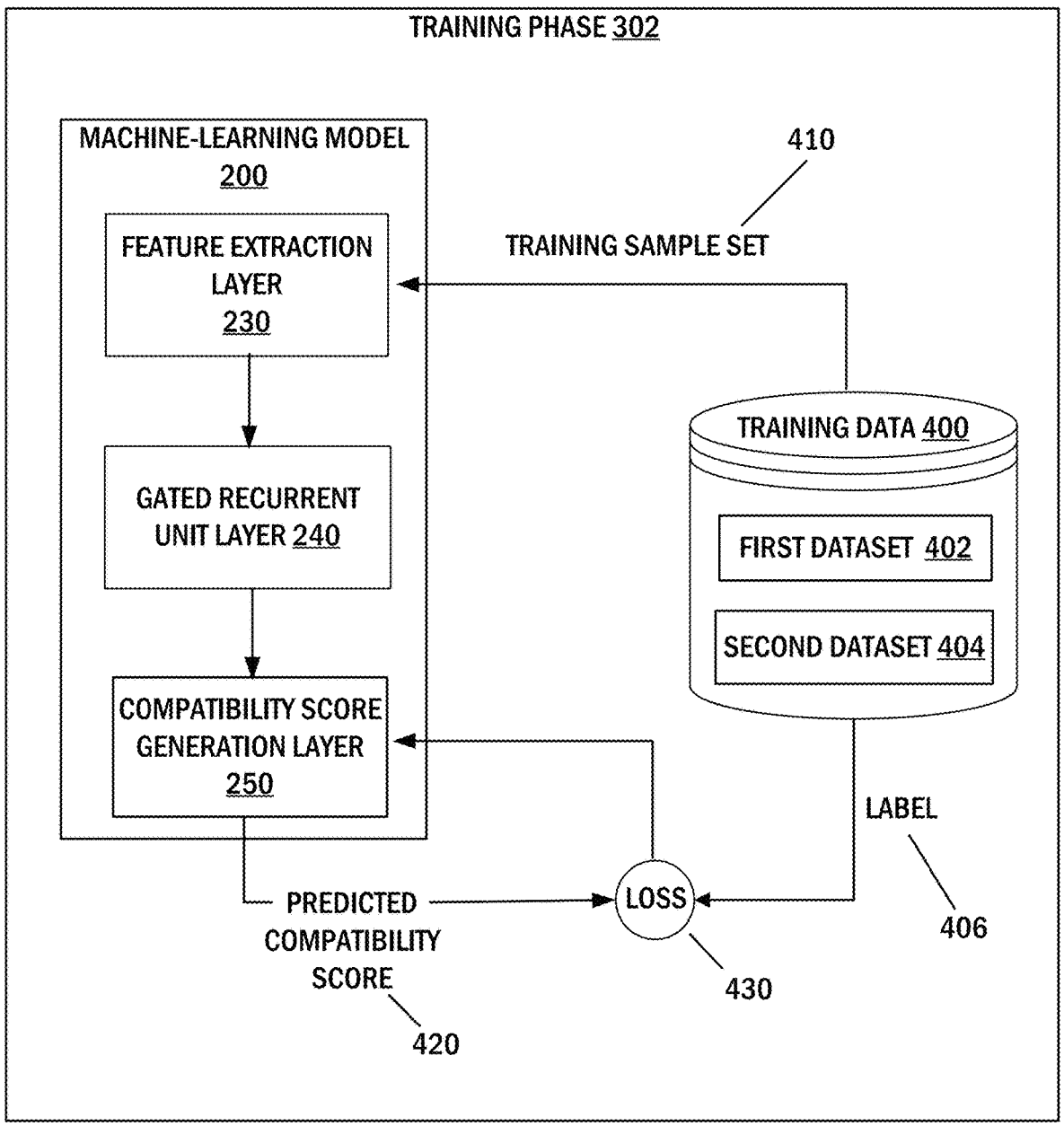
FIG. 4 illustrates an example training phase of a machine-learning model.

FIG. 4 illustrates an example training phase 302 of the machine-learning model 200. During the training phase 302, the machine-learning model is trained with training data 400. The training data 400 may include thousands of images of furniture items grouped and associated with labels 406 indicative of compatibility of the respective groupings. In some examples, the labels 406 are curated by humans having knowledge of furniture and furniture design, such as merchandising partners or home decorators. The training data 400 can be comprised of one or more distinct datasets, such as a first dataset 402 and a second dataset 404. One or both of the first dataset 402 and the second dataset 404 can be used to train the machine-learning model 200.

In some examples, the first dataset 402 can be comprised of a tens of thousands of furniture item images that span common furniture categories, such as lamps, chairs, dressers, tables, beds, and sofas. Each furniture image can be labeled with one of seventeen styles, such as modern, mid-century, or Victorian. One example of the first dataset 402 may include the Bonn Furniture Styles Dataset described in detail below with respect to FIG. 10.

The second dataset 404 can be comprised of a lesser number of furniture item images (e.g., thousands versus tens of thousands) that span a wider variety of furniture categories including tables, chairs, dressers, beds, sofas, nightstands, stools, benches, desks, headboards, drawers, cabinets, and mirrors. These furniture item images are arranged into (e.g., labeled as) compatible collections of variable sizes based on style, color, material, and/or texture to provide a notion of overall compatibility among furniture sets. This is advantageous over the first dataset 402 because the fact that two items have the same style does not imply necessarily compatibility (e.g., not all modern furniture items are compatible with each other). One example of the second dataset 404 may include the Furniture Collections Dataset described in detail below with respect to FIG. 10.

To train the machine-learning model 200, a training sample comprising a set 410 of furniture item images from the training data 400 (e.g., from one of the first dataset 402 or the second dataset 404) is received as input to the machine-learning model 200. The machine-learning model 200 may process the set 410, where the processing can include extracting features from the furniture item images using the feature extraction layer 230, processing the extracted features using the GRU layer 240, and predicting a compatibility score 420 for the set 410 using the compatibility score generation layer 250 as described in more detail above with respect to FIG. 2. The compatibility score 420 for the set 410 may be provided as output of the machine-learning model 200.

Because the set 410 was previously labeled (e.g., the label 406 indicative of compatibility of the set 410 is known), a loss function 430 can be performed using the compatibility score 420 for the set 410 and the label 406 for the set 410 to determine discrepancies or errors between the expected value (e.g., as described in the label 406) and the actual value returned by the machine-learning model 200). The discrepancies or errors can be fed back to the compatibility score generation layer 250 to improve accuracy of future predictions, such as by changing one or more of the parameters of the machine-learning model 200. A type of the loss function 430 can depend on the variant (e.g., Model I or Model II) of the machine-learning model 200 used, such as is described in detail above with respect to FIG. 2.

The set 410 can be one training sample of thousands of training samples from the training data 400 that is used to train the machine-learning model 200, whereby the processing described above to generate the compatibility score 420 and perform the loss function 430 for the set 410 is repeated for each respective training sample. Additionally, the training phase 302 can further encompass validation and testing of the machine-learning model 200 subsequent to training. Therefore, a number of the training samples within the training data 400 can be distributed based on a predetermined ratio for training, validation and testing. In other words, at least a portion of the training samples can be withheld from use in training for subsequent use in validation and testing.

As one illustrative example, the first dataset 402 can be split along individual furniture items according to a 68:12:20 ratio for training, validation, and testing. The first dataset 402 is arranged into positive ensembles of variable length (e.g., by randomly sampling furniture from the same style category) and negative ensembles of variable length (e.g., by sampling furniture items from different style categories). The length of the ensembles can be randomly selected from the interval [3, 6]. In one example, the resulting number of positive samples for training, validation, and testing can be 25,000; 3,300; and 5,000, respectively. The generated samples can be balanced such that the number of negative samples is the same as the number of positive samples for each of the training, validation and testing. Continuing with the above examples, the number of negative samples for training, validation, and testing can be 25,000; 3,300; and 5,000, respectively.

As another illustrative example, the second dataset 404 can be split along the compatible collections according to a 75:10:15 ratio for training, validation, and testing. These compatible collections form positive ensembles. To produce negative ensembles, individual items can be sampled at random across different furniture collections. The generated samples are balanced such that the number of negative samples is the same as the number of positive samples for each of the training, validation, and testing.

In some examples, an optimization process, such as the Adam optimizer (e.g., as described in Kingma & Ba, *Adam: A method for Stochastic Optimization*, arXiv:1412.6980v9 (Jan. 30, 2017), which is hereby incorporated by reference in its entirety for any and all purposes), may be utilized for training. Hyperparameters of the optimization process may be predetermined, including a number of epochs (e.g., a number of complete passes through a training dataset such as the first dataset 402 or the second dataset 404) and a batch size (e.g., a number of training samples to process before the internal parameters of the machine-learning model 200 are updated). As one example, the machine-learning model 200 can be trained for one-hundred epochs using the Adam optimizer, where the batch size may be dependent on the variant of the machine-learning model 200. For example, the batch size may be sixty-four training samples for Model I and thirty-two training samples for Model II. An additional and more detailed example training process is provided below with respect to FIG. 10. Once the machine-learning model 200 has been sufficiently trained, validated, and tested, the machine-learning model 200 can be applied during the prediction phase 304 to predict compatibility scores of sets having no associated label indicative of compatibility.

Figure 5:
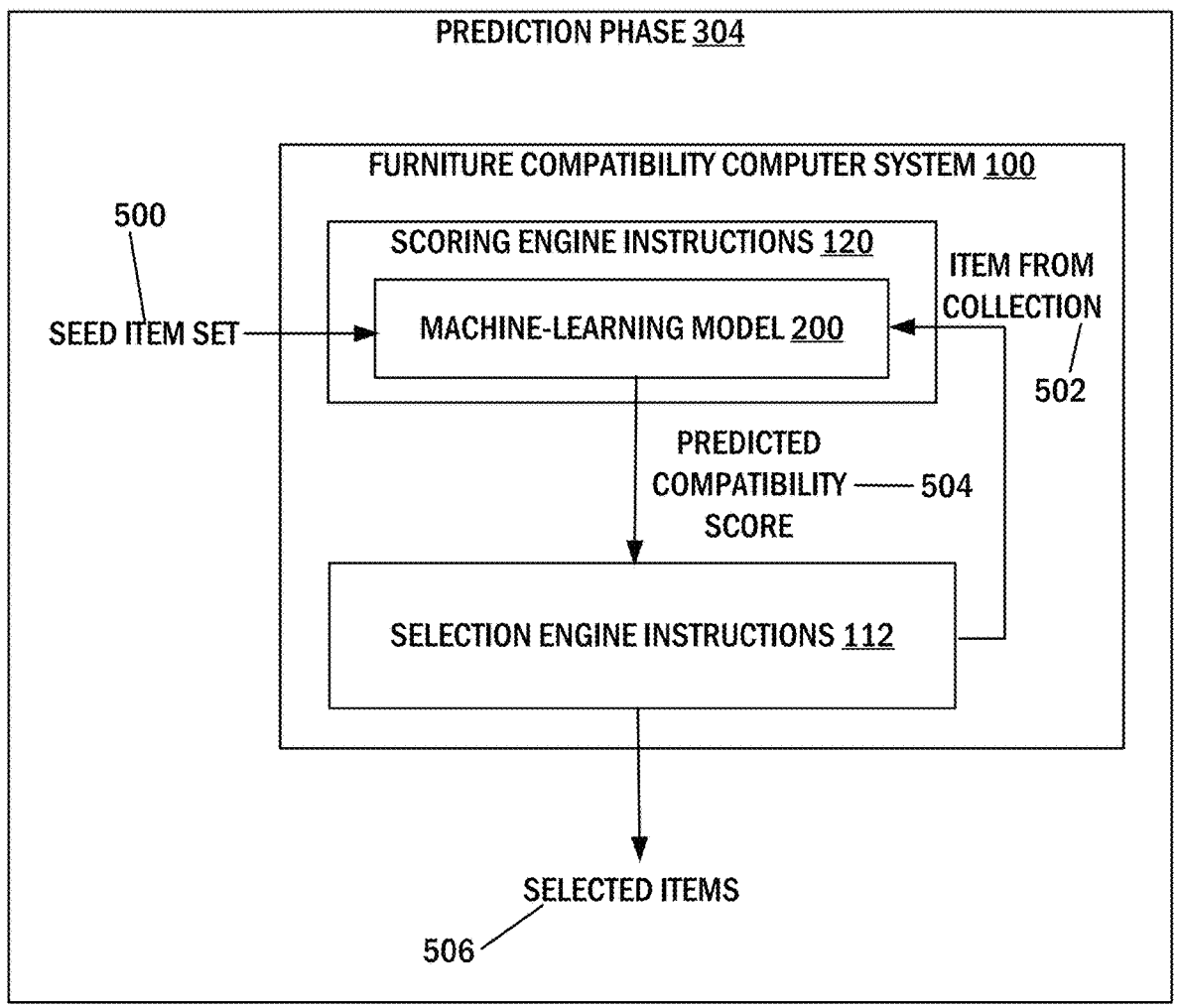
FIG. 5 illustrates an example prediction phase of a machine-learning model.

FIG. 5 illustrates an example prediction phase 304 of the machine-learning model 200. During the prediction phase 304, the furniture compatibility computing system 100 receives a seed item set 500. The seed item set 500 can be a set of images of furniture items already owned by a consumer or a set of images of furniture items the consumer is contemplating purchasing (e.g., the items are in a shopping cart of the consumer on the retailer's website), among other examples. In contrast to the training sample set 410 described with reference to FIG. 4, the seed item set 500 is unlabeled and does not have a compatibility-related indicator or score.

Upon execution of the scoring engine instructions 120 by the one or more processors 102 of the furniture compatibility computing system 100, the machine-learning model 200 of the furniture compatibility computing system 100 can receive the seed item set 500 as input. Additionally, as described in more detail below with respect to FIG. 7, the machine-learning model 200 can receive an image of a collection item 502 (e.g., an image of a furniture item that is sold by the retailer). The machine-learning model 200 can add the image of the collection item 502 to the seed item set 500 for processing to determine a compatibility of the collection item 502 across the seed item set 500. The processing can include extracting features from the images using the feature extraction layer 230, processing the extracted features using the GRU layer 240, and predicting a compatibility score 504 using the compatibility score generation layer 250 as described in more detail above with respect to FIG. 2. The compatibility score 504 may be provided as output of the machine-learning model 200. The compatibility score 504 may indicate a compatibility of the collection item 502 with one or more of the items in the seed item set 500.

The compatibility score 504 can be used for any of a variety of useful purposes, including the automatic selection (e.g., for recommendation) of furniture items matching furniture items within the seed item set 500. For example, this process can be repeated for a plurality of collection items where the corresponding plurality of predicted compatibility scores can be used to select a subset of the collection items to provide as recommendations (e.g., selected items 506).

Calculating Compatibility Score

Figure 6:
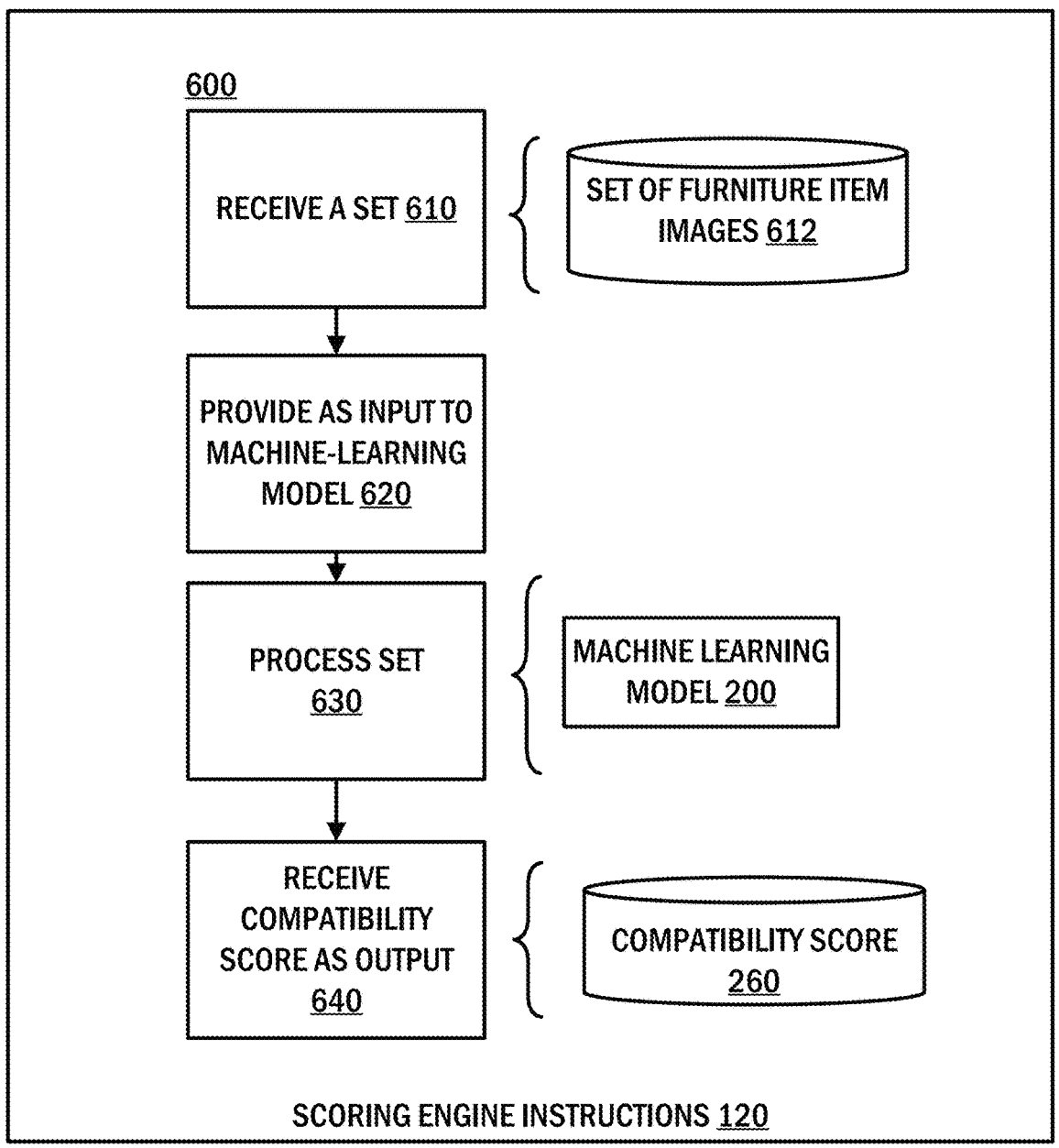
FIG. 6 illustrates a process for calculating a compatibility score of a set of furniture items.

FIG. 6 illustrates a process 600 for calculating a compatibility score of a set of furniture items. The process 600 can be performed by the one or more processors 102 of the furniture compatibility computing system 100 upon execution of the scoring engine instructions 120. The process 600 begins with operation 610.

At operation 610, a set of furniture item images 612 is received. The set of furniture item images 612 can be received in any of a variety of ways. In an example, the set of furniture item images 612 is provided via the scoring API 114 as URIs (Uniform Resource Identifiers) of locations of each of the items of the set of furniture item images 612 or as identifiers that can be used to obtain the images from the item data 130. Each image of the set of furniture item images 612 can be processed or checked to ensure compatibility with the machine-learning model 200 (e.g., resized, padded, color corrected, converted to a different format, etc.). Following operation 610, the flow of the process 600 moves to operation 620.

At operation 620, the set of furniture item images 612 is provided as input to the machine-learning model 200. In many examples, each image of the set of furniture item images 612 is converted to a format suitable for processing with the machine-learning model 200, such as a vector, array, or matrix. Following operation 620, the flow of the process 600 moves to operation 630.

At operation 630, the set of furniture item images 612 is processed by the machine-learning model 200. Processing with the machine-learning model 200 can include extracting features from the furniture item images 612, processing the extracted features using the GRU layer 240, and calculating the compatibility score 260 using the compatibility score generation layer 250 as described in more detail above with respect to FIG. 2.

At operation 640, the compatibility score 260 is obtained as output from the machine-learning model 200. The compatibility score 260 can be used for any of a variety of useful purposes, including the automatic selection (e.g., for recommendation) of furniture items matching a given item or set of items, as described below with respect to FIG. 7.

Selection Based on Seed Furniture Item

Figure 7:
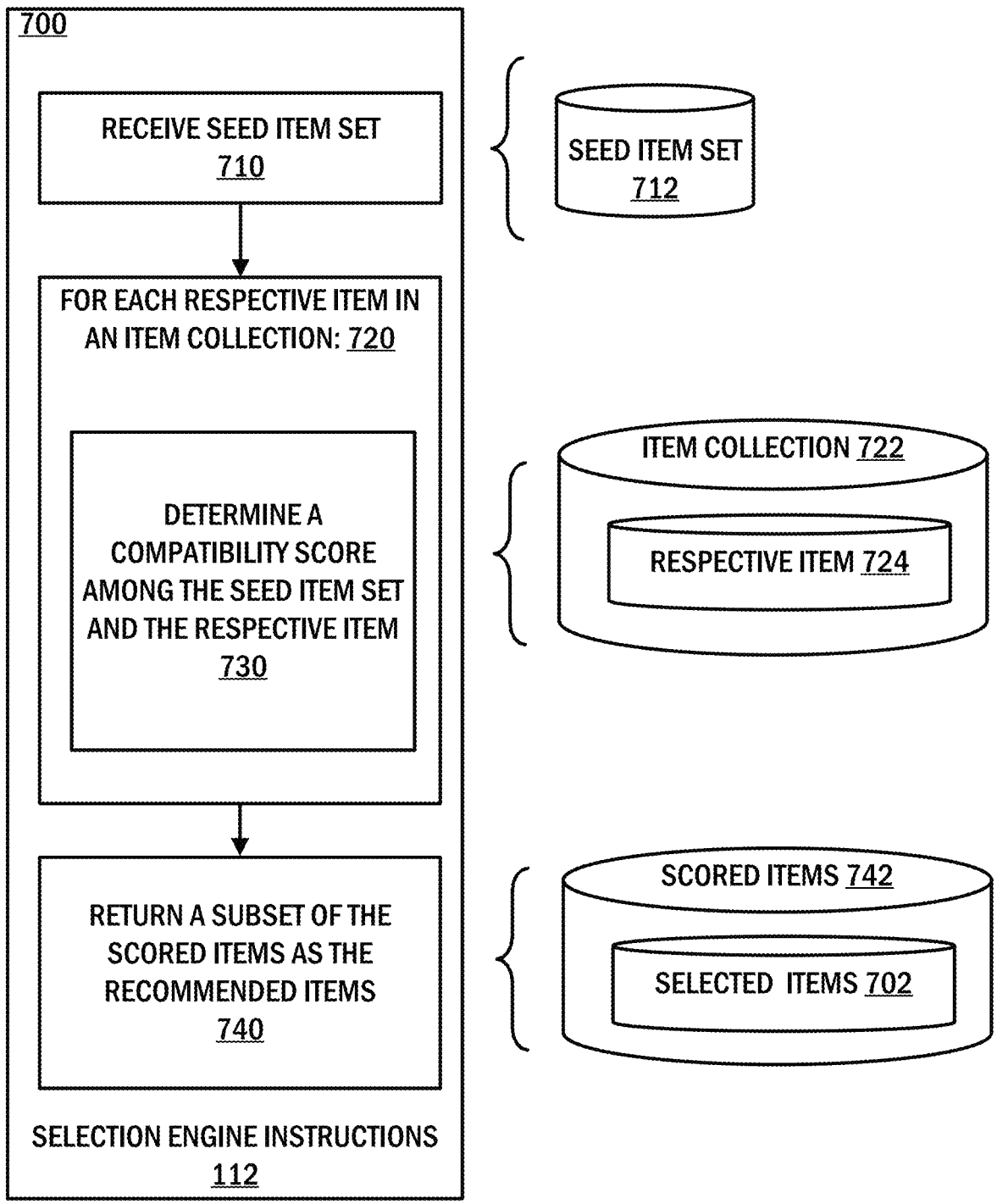
FIG. 7 illustrates a process for providing furniture item recommendations based on a seed item set.

FIG. 7 illustrates a process 700 for selecting one or more items 702 (e.g., to provide as furniture item recommendations) based on a seed item set 712. The process 700 can be performed by the one or more processors 102 of the furniture compatibility computing system 100 upon execution of the selection engine instructions 112. The process includes and begins with operation 710.

Operation 710 includes receiving the seed item set 712. The seed item set 712 can be a set of one or more furniture items on which selections are to be based. In examples, the seed item set 712 includes identifiers of one or more furniture items. In other examples, the seed item set 712 is a set of one or more furniture item images. In many examples, the seed item set 712 is received as input (e.g., as part of an API call) from the retail server 12. For instance, while providing a web page to a user, the retail server 12 can provide an identifier of one or more items being described by the web page (e.g., the web page may be a product page selling a furniture item). The web page can send a set of furniture items (e.g., identifiers of such items) as the seed item set 712 for processing with the selection engine instructions 112 to receive the selected items 702 to be displayed to the user along with the one or more items being described by the web page. In some examples, the seed item set 712 can be a set of furniture items in a shopping cart of a customer of the retail server 12. In another example, the seed item set 712 can be a set of furniture items received from a customer and may represent, for example, a set of furniture items that a customer has in a room of the customer's house (e.g., to help find furniture items compatible with the customer's existing furniture). In this example, the identifiers of the furniture items can be included in the seed item set 712. Following operation 710, the flow of the process 700 can move to operation 720.

Operation 720 includes, performing operation 730 for each respective item 724 in an item collection 722. The item collection 722 is a collection of furniture items. The collection of furniture items can include furniture items available for sale by the retailer. In many examples, the item collection 722 is a data structure (e.g., a list or an array) storing a plurality of identifiers of furniture items. The item collection 722 can be obtained from the item data 130. In an example, the item collection 722 is a subset of furniture items from the item data 130 selected based on the seed item set 712. For example, the item collection 722 can be selected as items in the item data 130 that are of a furniture category other than the one or more furniture categories of the one or more items in the seed item set 712. For instance, where the seed item set 712 includes a coffee table and a couch (e.g., being respectively in the "table" and "couch" categories), the item collection 722 can be furniture items from categories including TV stands, lamps, planters, art, curtains, chairs, or other categories of furniture items that are different from those in the seed item set 712. This can help increase the relevance of the selected items 702 because a user that already has items of one category likely would not want to be recommended items from the same category that are highly compatible the seed item set 712. In other examples, the user may provide examples of many different items of the same category that the user likes and can use that to find other items of the same category that the user will also like.

Operation 730 includes determining a compatibility score of the seed item set 712 and the respective item 724 in the item collection 722. The compatibility score can be determined using the machine-learning model 200 using the process 600. For example, images associated with the furniture items of the seed item set 712 and an image associated with the respective item 724 are combined to form the set of furniture item images 612 provided as input to the machine-learning model 200 to obtain the compatibility score 260. The images can be obtained in any of a variety of ways. For example, the images can be looked up and obtained from a data store using an identifier of the seed item set 712 and an identifier of the respective item 724.

After completing operation 720, there will be a collection of scored items 742 and the flow of the process can move to operation 740.

Operation 740 includes returning a subset of the scored items 742 as the selected items 702. In some examples, the scored items 742 will have a range of scores ranging from completely incompatible to completely compatible (e.g., ranging from 0 to 1) with the seed item set 712. The subset can be selected as the items having the top N highest scores, where N is an integer. The value of N can be fixed or variable. For instance, the retail server 12 can send the seed item set 712 with a request for a certain number of recommended items, and N can be set to that certain number. Returning the selected items 702 can include sending identifiers of the selected items 702 to the retail server 12. The retail server 12 can then provide the selected items 702 for display at the user device 14.

Retailer Interface

Figure 8:
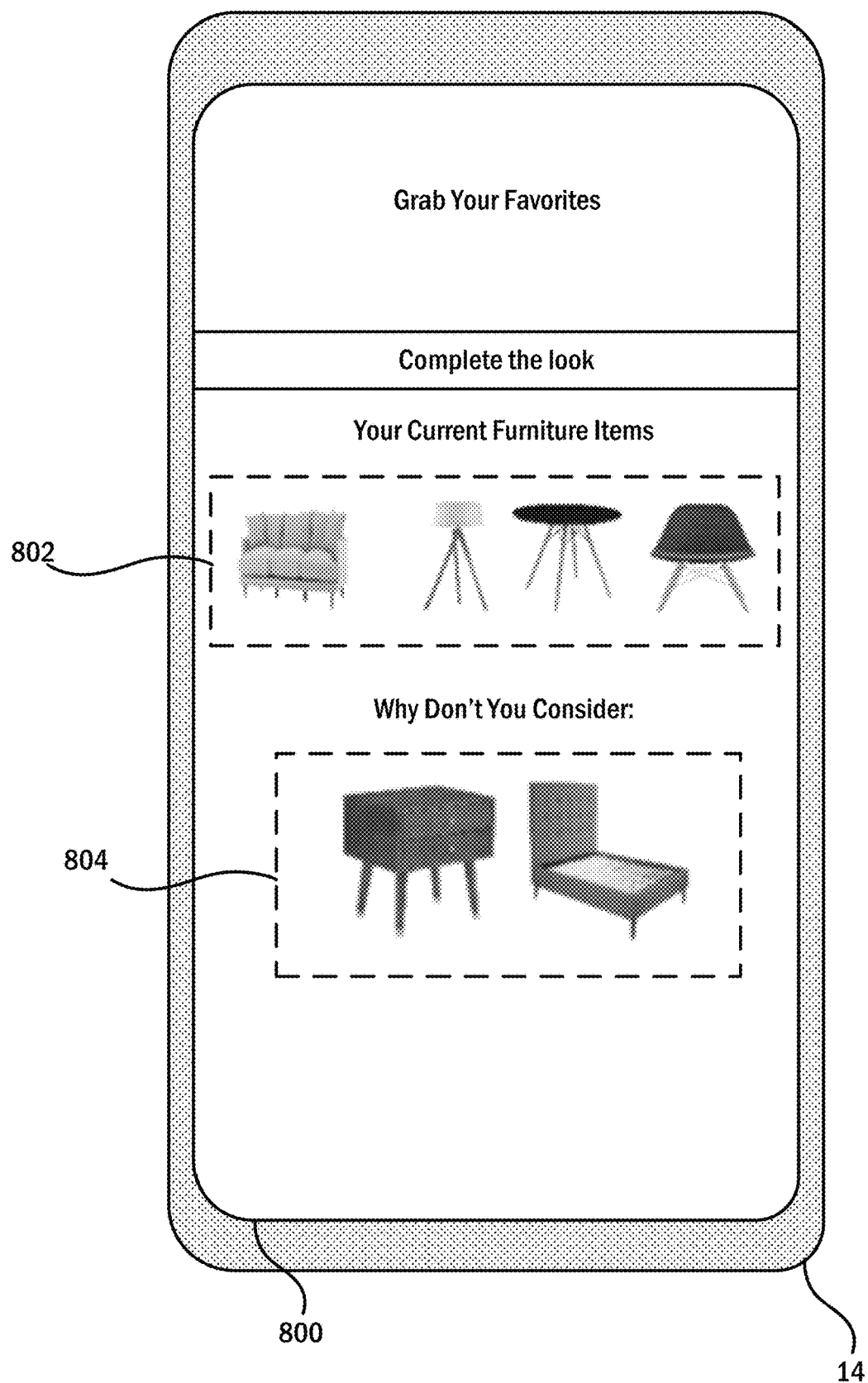
FIG. 8 illustrates the user device displaying a retailer interface configured to display furniture item recommendations according to an example implementation.

FIG. 8 illustrates the user device 14 displaying a retailer interface 800 configured to provide furniture item selections according to an example implementation. The retailer interface 800 can be presented within a retailer website (e.g., such as may be provided by the retail server 12) or a retailer application. The retailer interface 800 can present a set of selected furniture items (e.g., recommendations based on a user selection of a set of furniture items). As illustrated, based on an existing set of furniture items 802 of a user (e.g., a set already owned by or a set selected by the user based on interest), a selection of items 804 can be presented via the retailer interface 800 as a recommendation to the user. The selection of items 804 may be items determined to be compatible with the existing set of furniture items 802 using the processes described above. The specific recommendations will change according to which item is selected by the user, as noted above.

Example System

Figure 9:
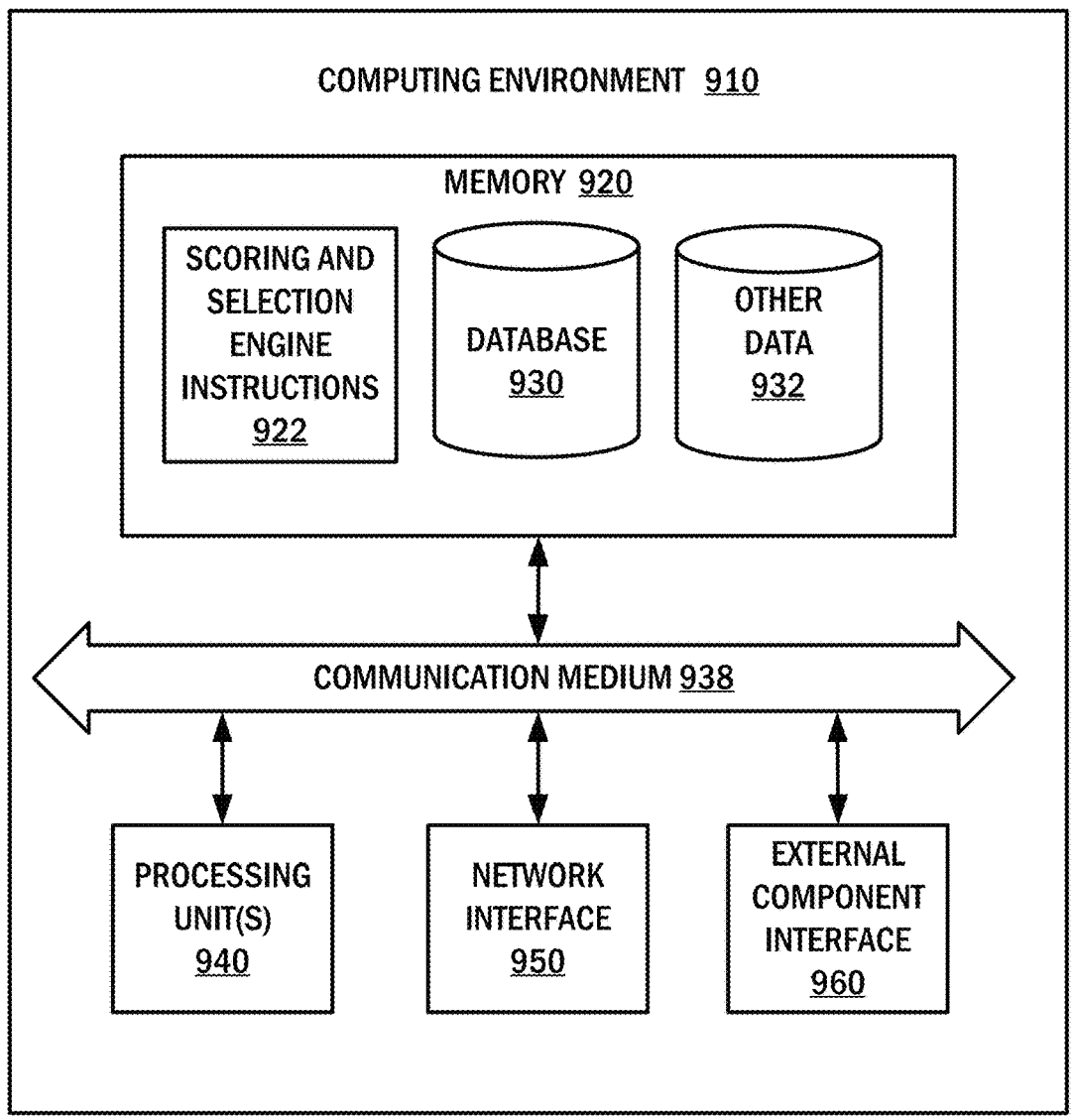
FIG. 9 illustrates an example system with which disclosed systems and methods can be used.

FIG. 9 illustrates an example system 900 with which disclosed systems and methods can be used. In an example, the system 900 can include a computing environment 910. The computing environment 910 can be a physical computing environment, a virtualized computing environment, or a combination thereof. The computing environment 910 can include memory 920, a communication medium 938, one or more processing units 940, a network interface 950, and an external component interface 960.

In some examples, the memory 920 may be the same or similar to the memory 104 described with respect to FIG. 1. The memory 920 can include a computer readable storage medium. The computer storage medium can be a device or article of manufacture that stores data and/or computer-executable instructions. The memory 920 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 920 can store various types of data and software. For example, as illustrated, the memory 920 includes scoring engine instructions 120 and selection engine instructions 112, collectively scoring and selection engine instructions 922, for implementing one or more aspects of the furniture compatibility computing system 100 described herein, database 930, as well as other data 932. In some examples the memory 920 can include instructions for generating a website and/or maintaining product information.

The communication medium 938 can facilitate communication among the components of the computing environment 910. The data bus 106 described with respect to FIG. 1 may be one example type of the communication medium 938. In an example, the communication medium 938 can facilitate communication among the memory 920, the one or more processing units 940, the network interface 950, and the external component interface 960. The communication medium 938 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

In some examples, the one or more processing units 940 may be the same or similar to the processors 102 described with respect to FIG. 1. The one or more processing units 940 can include physical or virtual units that selectively execute software instructions. In an example, the one or more processing units 940 can be physical products comprising one or more integrated circuits. The one or more processing units 940 can be implemented as one or more processing cores. In another example, one or more processing units 940 are implemented as one or more separate microprocessors. In yet another example embodiment, the one or more processing units 940 can include an application-specific integrated circuit (ASIC) that provides specific functionality. In yet another example, the one or more processing units 940 provide specific functionality by using an ASIC and by executing computer-executable instructions.

The network interface 950 enables the computing environment 910 to send and receive data from a communication network (e.g., network 16). The communication interface 108 described with respect to FIG. 1 may be one example type of the network interface 950. The network interface 950 can be implemented as an Ethernet interface, a token-ring network interface, a fiber optic network interface, a wireless network interface (e.g., WI-FI), or another type of network interface.

The external component interface 960 enables the computing environment 910 to communicate with external devices. For example, the external component interface 960 can be a USB interface, Thunderbolt interface, a Lightning interface, a serial port interface, a parallel port interface, a PS/2 interface, and/or another type of interface that enables the computing environment 910 to communicate with external devices. In various embodiments, the external component interface 960 enables the computing environment 910 to communicate with various external components, such as external storage devices, input devices, speakers, modems, media player docks, other computing devices, scanners, digital cameras, and fingerprint readers.

Although illustrated as being components of a single computing environment 910, the components of the computing environment 910 can be spread across multiple computing environments 910. For example, one or more of instructions or data stored on the memory 920 may be stored partially or entirely in a separate computing environment 910 that is accessed over a network.

Experiments

Each variant of the machine-learning model 200, Model I and Model II described in detail above with respect to FIG. 2 were constructed, trained, and tested. Their performance compares favorably against traditional techniques using siamese-based models, as will be shown below. In particular, experiments were performed using two datasets: the Bonn Furniture Styles Dataset and a Furniture Collections Dataset. These datasets can be examples of the first dataset 402 and the second dataset 404, respectively, that are described above with reference to FIG. 4.

The Bonn Furniture Styles Dataset made available for research and commercial purposes as part of Aggarwal et al., *Learning Style Compatibility for Furniture*, GERMAN CONFERENCE ON PATTERN RECOGNITION, pp. 552-566 (Springer, 2018) includes approximately 90,000 furniture images, obtained from the website Houzz, which specializes in furniture and interior design. The images span the six common furniture categories on the website: lamps (32,403 images), chairs (22,247 images), dressers (16,885 images), tables (8,183 images), beds (6,594 images) and sofas (4,080 images). Each image presents the item in a white background and is labeled with one of seventeen styles, such as modern, mid-century, or Victorian.

The Furniture Collections Dataset includes approximately 5,279 furniture images with a default resolution of 400×400 pixels. The images span a wider variety of categories, including tables (1,487 images), chairs (653 images), dressers (381 images), beds (379 images), sofas (320 images), nightstands (233 images), stools (220 images), benches (154 images), and over ten other categories (e.g., desks, headboards, drawers, cabinets, and mirrors) with a smaller number of items. These items have been arranged into 1,554 compatible collections by home decor specialists. These collections vary in size, from two to sixty-six items (though 97% of collections contain eight items or less). While most collections are complementary, for the purposes of the experiment, the definition of collection was expanded to include any number of compatible items, even if a category appears more than once. For example, an office-style collection may include twenty slightly different office chairs. While the Furniture Collections Dataset is smaller in size compared to the Bonn Furniture Dataset, the Furniture Collections Dataset provides a notion of overall compatibility among furniture sets. While the Bonn Furniture Dataset classifies furniture pieces across multiple styles, the fact that two items have the same style does not imply necessarily compatibility (e.g., not all modern furniture items are compatible with each other). By contrast, the Furniture Collections Dataset assembles furniture pieces into sets that are compatible not only in style, but also in color, and oftentimes material and texture as well.

For the experiment, Model I and Model II were used to predict whether furniture items of a set are compatible using both the Bonn Furniture Dataset and the Furniture Collections Dataset. For the experiment with the Bonn Furniture Dataset, a set of items are considered compatible if and only if they have the same style attribute (e.g. all baroque items are compatible, and all "baroque" items are incompatible with all "modernist" items). For the experiment with the Furniture Collections Dataset, two items are considered compatible if and only if they belong to the same set. These definitions used in the experiment artificially limit the definition of compatible and as used herein, definitions of compatible need not be so limited–furniture items across style types or sets may be compatible. But these assumptions provide unambiguous definitions of compatibility usable at least for experimentally determining the capabilities of disclosed technology, and success according to these definitions indicates the extent to which a recommendation model has learned meaningful style attributes.

For each test set, the compatibility score was calculated according to the respective equations for Model I and II described above. The area under the ROC curve (AUC) is generated by sweeping the success threshold over the interval [0, 1].

For the experiment with the Bonn Furniture Dataset, the results of the models were compared with the results in Aggarwal et al., *Learning Style Compatibility for Furniture*, Aggarwal et al., GERMAN CONFERENCE ON PATTERN RECOGNITION, pp. 552-566 (Springer, 2018). The same data partitions as in Aggarwal were used. For example, Aggarwal split the Bonn Furniture Dataset along individual furniture items according to a 68:12:20 ratio for training, validation and testing. To train the model here, the training set was arranged into positive ensembles of variable length, by randomly sampling furniture from the same style category, and negative ensembles of variable length by sampling furniture items from different style categories. The length of the ensembles was randomly selected from the interval [3, 6]. The resulting number of positive samples for training, validation and testing was 25,000; 3,300; and 5,000, respectively. The generated samples were balanced: the number of negative samples was the same the number of positive samples for each partition.

For the experiment with the Furniture Collections Dataset, the furniture sets were split according to a 75:10:15 ratio for training, validation and testing. These sets made up the positive ensembles, and to produce negative ensembles, individual items were sampled at random across different furniture collections. The number of negative samples was set to a same value as the number of positive samples.

The CNN used in the feature extraction layer 230 for the experiments to attain the initial node representation was AlexNet with the last layer removed. Therefore, the dimensionality of the node features is L=4096. The number of GRU steps in the GRU layer 240 was set to 3. The models were trained for 100 epochs using the Adam optimizer with default momentum values $\beta_1=0.9$ and $\beta_2=0.999$, with hyperparameters chosen via cross-validation, which results in a base learning rate of $3\times10^{-6}$ and $3\times10^{-5}$ for the CNN and the rest of the model, respectively, margin m=20, M=4096, and J=4096. The batch size was set to 64 training samples for Model I and 32 training samples for Model II.

For the Bonn Furniture Dataset, the CNN was initialized with AlexNet pre-trained on ImageNet and the rest of the model weights were initialized with the method described in Glorot et al., *Understanding the Difficulty of Training Deep Feedforward Neural Networks*, PROCEEDINGS OF THE THIRTEENTH INTERNATIONAL CONFERENCE ON ARTIFICIAL INTELLIGENCE AND STATISTICS, pp.

249-256 (2010), which is hereby incorporated by reference in its entirety for any and all purposes. For the Furniture Collections Dataset, since the number of sets was limited, the model was initialized with the model trained on the Bonn Furniture Dataset. For both datasets, the first three convolutional layers of the CNN were kept frozen during training. For comparison purposes, the authors in Aggarwal provided the canonical siamese network they trained on the Bonn Furniture Dataset. The canonical siamese network used two identical pre-trained CNN bases from GoogLeNet for two image inputs in parallel, connected with a fully connected layer on top to minimize distance of embeddings of items in the same style and push away embeddings of items in different categories. The CNN used with Model I and Model II was pre-trained GoogLeNet on ImageNet with the last layer removed.

Since siamese models predict compatibility based on input pairs but Model I and Model II predicts the compatibility of the entire furniture set, an approach proposed by previous works on fashion compatibility was used to compare the two models (see, e.g., Cui et al., *Dressing as a Whole: Outfit Compatibility Learning Based on Node-Wise Graph Neural Networks*, THE WORLD WIDE WEB CONFERENCE, pp. 307-317 (ACM, 2019) and Han et al., *Learning Fashion Compatibility with Bidirectional LSTMS*, PROCEEDINGS OF THE 25TH ACM INTERNATIONAL CONFERENCE ON MULTIMEDIA, pp. 1078-1086 (ACM, 2017), which are hereby incorporated by reference in their entirety). The approach includes averaging pair-wise compatibility of all pairs in the set. The comparison between the models for each of the datasets and the canonical siamese network is shown in the Table, below. The AUC of the models was higher than that of the best-performing prior model on the Bonn Furniture Dataset. The models also outperform the siamese networks on the Furniture Collections Dataset.

TABLE

|  | Bonn Dataset (AUC) | Furniture Collections (AUC) |
| --- | --- | --- |
| Canonical Siamese | 0.875 | 0.871 |
| Model I | 0.882 | 0.928 |
| Model II | 0.89 | 0.934 |

Figure 10:
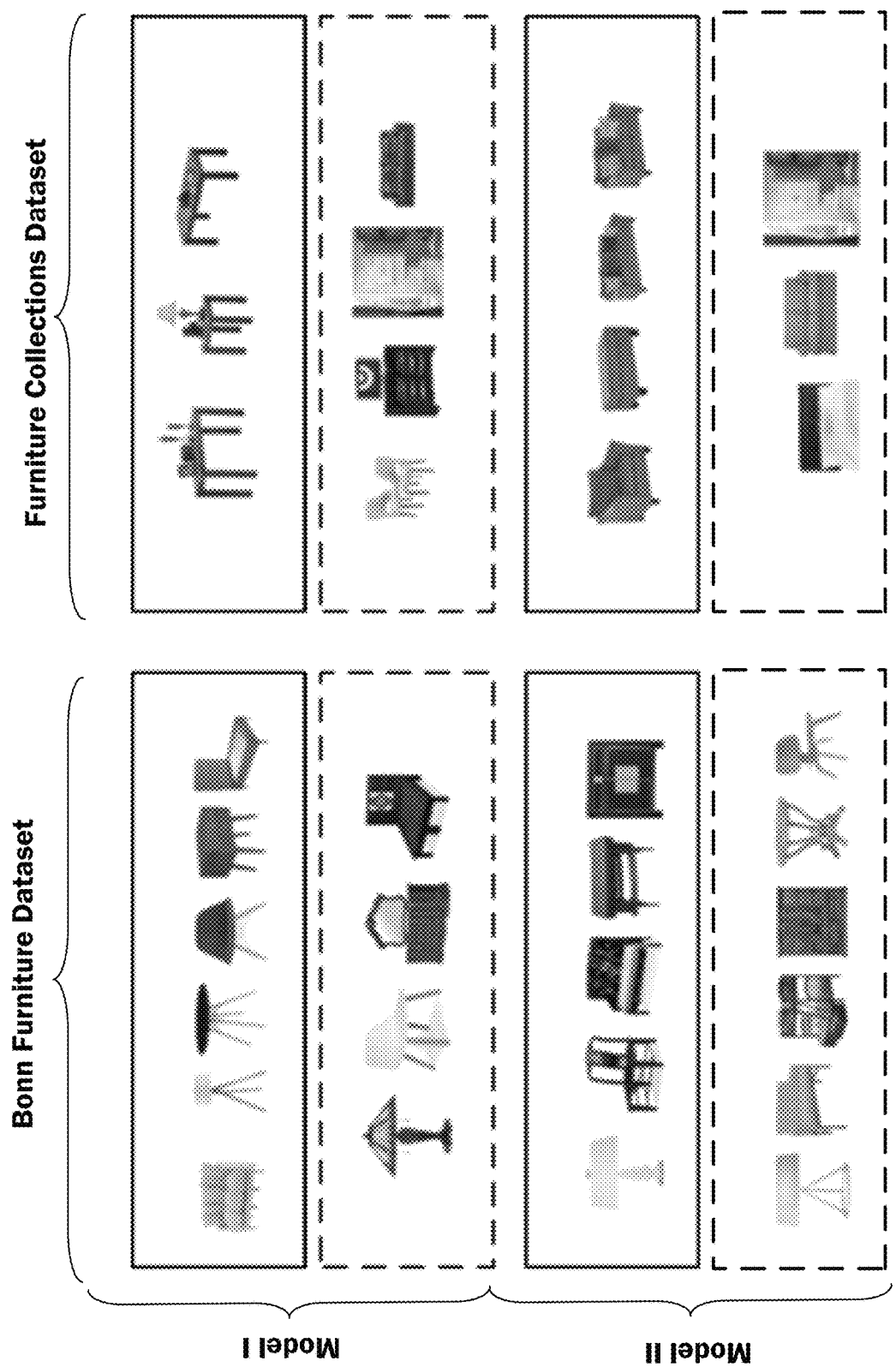
FIG. 10 shows qualitative results of variants of a machine-learning model.

FIG. 10 shows qualitative results of Model I and Model II for each of the Bonn Furniture Dataset and the Furniture Collections Dataset from the above-described experiments. The sets with the highest predicted compatibility scores are shown in solid lines and the sets with the lowest predicted compatibility scores are shown in dashed lines, respectively. From this figure, it is observed that both Model I and Model II can predict if a set of furniture items forms a compatible set. In the case of the Bonn Furniture Dataset, the set with the highest compatibility score corresponds to furniture items with the same style, traditional for Model I and Mediterranean for Model II, while the set with the lowest compatibility score corresponds to a collection of items of different style. In the case of the Furniture Collections Dataset, the visual results indicate that the network successfully learned a notion of compatibility which does not only involve style, but also color, complementary functionality and aesthetics. For example, the sample with the highest compatibility score generated by Model I corresponds to a collection of living room tables which go well together. Similarly, the highest compatibility score generated by Model II corresponds to a living room set with matching colors and style.

Experiments on the Bonn Furniture Dataset, a dataset where compatibility is fully determined by style, and the Furniture Collections Dataset, a dataset where compatibility is determined by home decor specialists, showed that the each variant of the machine-learning model 200 outperform previous siamese-based methods at predicting furniture compatibility. In view of these results, the technical problem of furniture compatibility determination can be properly addressed with GNN-based models to leverage the relational information between items belonging to a furniture set.

According to some examples, methods for determining a furniture compatibility score are described. An example method comprising: receiving images of furniture items within a set; converting the images into a graph representation of the set comprising a plurality of nodes, wherein each of the furniture items corresponds to a respective node of the plurality of nodes and each respective node has a hidden state; for the plurality of nodes, updating the hidden state of each respective node with information from nodes neighboring the respective node; and generating a compatibility score of the set based on the updated hidden state of each respective node.

In other examples, converting the images into the graph representation includes extracting features of each furniture item in the set from the images, and mapping the features to a latent semantic space with a convolutional neural network. To generate the compatibility score, distances for the plurality of nodes are determined between the updated hidden state of each respective node to a centroid; an average of the distance is determined, and the average is passed through a sigmoid function to generate the compatibility score.

In further examples, the hidden state of each respective node is updated using a gated recurrent unit. The hidden state of each respective node is updated by obtaining a message and the hidden state as input, producing a new hidden state, and setting the new hidden state as the hidden state of each respective node. The hidden states are averaged, the average is passed through a fully connected layer, a rectified linear unit (ReLU) activation function is applied to attain a representation, and the compatibility score is generated based on the representation. The compatibility score as output for use in selecting furniture items to provide as a recommendation.

According to other examples, methods for providing furniture item recommendations based on compatibility are described. An example method comprising: receiving images of one or more furniture items associated with a user; identifying a furniture item that is distinct from the one or more furniture items; forming a set of furniture item images from the received images and an image of the identified furniture item; providing the set as input to a machine-learning model comprising a graph neural network that processes the set to predict a compatibility score of the set; receiving the compatibility score as output from the machine-learning model; and providing the identified furniture item as a recommendation to the user based on the compatibility score.

In other examples, the graph neural network represents the set as a graph. The graph includes a plurality of nodes corresponding to each of the furniture item images in the set, and a plurality of edges connecting the plurality of nodes that identify interactions between connected nodes. The graph neural network is trained prior to providing the set as input to the machine-learning model. To train the graph neural network, a plurality of training samples are provided as input to the machine-learning model, where each of the plurality of training samples corresponds to a respective set of furniture item images having a label that indicates a compatibility of the respective set. For each of the plurality of training samples, a predicted compatibility score for the respective set of furniture item images is received as output from the machine-learning model, an error is determined based on the predicted compatibility score and the label for the respective set of furniture item images, and the error is used to increase an accuracy of the graph neural network.

In further examples, a portion of the graph neural network extracts features from each furniture item image in a training sample, and to train the graph neural network, a distance between features extracted from a positive training sample is minimized; and a distance between features extracted from a negative training sample is maximized. The compatibility score of the set is determined to be greater than a predetermined threshold, the identified furniture item is provided as the recommendation to the user in response to the determination.

According to further examples, systems for providing furniture item recommendations based on compatibility are described. An example system comprises a processor and a memory communicatively coupled to the processor. The memory stores instructions that, when executed by the processor, cause the system to: receive images of one or more furniture items associated with a user; identify a furniture item that is distinct from the one or more furniture items; form a set of furniture item images from the received images and an image of the identified furniture item; provide the set as input to a machine-learning model comprising a graph neural network that processes the set to predict a compatibility score of the set; receive the compatibility score as output from the machine-learning model; and provide the identified furniture item as a recommendation to the user based on the compatibility score.

In other examples, the graph neural network includes a feature extraction layer that extracts features from each of the furniture item images in the set using the feature extraction layer. The graph neural network also includes a gated recurrent unit layer that processes the extracted features. The graph neural network further includes a compatibility score generation layer that predicts the compatibility score based on output from the gated recurrent unit layer. The images of the one or more furniture items associated with the user are a seed item set. The seed item set includes one or more of images of furniture items owned by the user and images of furniture items of interest to the user for purchase.

In further examples, the identified furniture item is associated with a collection of furniture items available for sale by a retailer. To identify the furniture item, one or more categories associated with the one or more furniture items associated with the user are determined, and the collection of furniture items is retrieved from item data associated with the retailer, where the collection of furniture items is associated with a category that is distinct from the determined one or more categories. Using each furniture item within the collection, a plurality of sets of furniture item images are formed from the received images and a respective image of each furniture item within the collection. The plurality of sets are provided as input to the machine-learning model, and respective compatibility scores for the plurality of sets are received as output from the machine-learning model. The respective compatibility scores are compared, and a subset of the furniture items within the collection is selected to provide as the recommendation to the user based on the comparison, the subset including at least the identified furniture item. Sets associated with the subset of the furniture items have respective compatibility scores among a top N highest compatibility scores.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. A method for determining a furniture compatibility score, the method comprising:
    receiving images of furniture items within a set as input to a machine-learning model comprising a graph neural network that processes the set to predict a compatibility score of the set, wherein the graph neural network is trained using a training sample prior to receiving the images of the furniture items;
    converting the images into a graph representation of the set comprising a plurality of nodes, wherein each of the furniture items corresponds to a respective node of the plurality of nodes and each respective node has a hidden state;
    for the plurality of nodes, updating the hidden state of each respective node with information from nodes neighboring the respective node; and
    generating a compatibility score of the set based on the updated hidden state of each respective node.

2. The method of claim 1, wherein converting the images into the graph representation comprises:
    extracting features of each furniture item in the set from the images; and
    mapping the features to a latent semantic space with a convolutional neural network.

3. The method of claim 1, wherein generating the compatibility score comprises:
    for the plurality of nodes, determining distances between the updated hidden state of each respective node to a centroid;
    determining an average of the distances; and passing the average through a sigmoid function to generate the compatibility score.

4. The method of claim 1, wherein updating the hidden state of each respective node includes using a gated recurrent unit.

5. The method of claim 1, wherein updating the hidden state of each respective node comprises:
    obtaining a message and the hidden state as input;
    producing a new hidden state; and
    setting the new hidden state as the hidden state of each respective node.

6. The method of claim 1, wherein generating the compatibility score of the set based on the updated hidden state of each respective node comprises:
    determining an average of the hidden states;
    passing the average through a fully connected layer;
    applying a rectified linear unit (ReLU) activation function to attain a representation; and
    generating the compatibility score based on the representation.

7. The method of claim 1, further comprising providing the compatibility score as output for use in selecting furniture items to provide as a recommendation.

8. A method for providing furniture item recommendations based on compatibility, the method comprising:
    receiving images of one or more furniture items associated with a user;
    identifying a furniture item that is distinct from the one or more furniture items;
    forming a set of furniture item images from the received images and an image of the identified furniture item;
    providing the set as input to a machine-learning model comprising a graph neural network that processes the set to predict a compatibility score of the set, the graph neural network being previously trained using a training sample including a plurality of images of furniture items;
    receiving the compatibility score as output from the machine-learning model; and
    providing the identified furniture item as a recommendation to the user based on the compatibility score.

9. The method of claim 8, wherein the graph neural network represents the set as a graph, and the graph includes:
    a plurality of nodes corresponding to each of the furniture item images in the set; and
    a plurality of edges connecting the plurality of nodes that identify interactions between connected nodes.

10. The method of claim 8, wherein training the graph neural network comprises:
    providing a plurality of training samples as input to the machine-learning model, wherein each of the plurality of training samples corresponds to a respective set of furniture item images having a label that indicates a compatibility of the respective set; and
    for each of the plurality of training samples:
        receiving a predicted compatibility score for the respective set of furniture item images as output from the machine-learning model;
        determining an error based on the predicted compatibility score and the label for the respective set of furniture item images; and
        using the error to increase an accuracy of the graph neural network.

11. The method of claim 10, wherein a portion of the graph neural network extracts features from each furniture item image in a training sample, and training the graph neural network further comprises:
    minimizing a distance between features extracted from a positive training sample; and
    maximizing a distance between features extracted from a negative training sample.

12. The method of claim 8, further comprising:
    determining the compatibility score of the set is greater than a predetermined threshold; and
    providing the identified furniture item as the recommendation to the user in response to the determination.

13. A system for providing furniture item recommendations based on compatibility, the system comprising:
    a processor;
    a memory communicatively coupled to the processor, the memory storing instructions that, when executed by the processor, cause the system to:
        receive images of one or more furniture items associated with a user;
        identify a furniture item that is distinct from the one or more furniture items;
        form a set of furniture item images from the received images and an image of the identified furniture item;
        provide the set as input to a machine-learning model comprising a graph neural network that processes the set to predict a compatibility score of the set, the graph neural network being previously trained using a training sample including a plurality of images of furniture items;
        receive the compatibility score as output from the machine-learning model; and
        provide the identified furniture item as a recommendation to the user based on the compatibility score.

14. The system of claim 13, wherein the graph neural network comprises:
    a feature extraction layer that extracts features from each of the furniture item images in the set using the feature extraction layer;
    a gated recurrent unit layer that processes the extracted features; and
    a compatibility score generation layer that predicts the compatibility score based on output from the gated recurrent unit layer.

15. The system of claim 13, wherein the images of the one or more furniture items associated with the user are a seed item set.

16. The system of claim 15, wherein the seed item set includes one or more of images of furniture items owned by the user and images of furniture items of interest to the user for purchase.

17. The system of claim 13, wherein the identified furniture item is associated with a collection of furniture items available for sale by a retailer, and to identify the furniture item, the instructions are executed to cause the system to:
    determine one or more categories associated with the one or more furniture items associated with the user; and
    retrieve, from item data associated with the retailer, the collection of furniture items, wherein the collection of furniture items is associated with a category that is distinct from the determined one or more categories.

18. The system of claim 17, wherein the instructions are executed to cause the system to:
    using each furniture item within the collection, form a plurality of sets of furniture item images from the received images and a respective image of each furniture item within the collection;

provide the plurality of sets as input to the machine-learning model;
receive respective compatibility scores for the plurality of sets as output from the machine-learning model;
compare the respective compatibility scores; and
select a subset of the furniture items within the collection to provide as the recommendation to the user based on the comparison, the subset including at least the identified furniture item.

19. The system of claim 18, wherein sets associated with the subset of the furniture items have respective compatibility scores among a top N highest compatibility scores.

* * * * *